Jan. 11, 1938.     L. R. GRANDY ET AL     2,104,800
RADIO STATIC ELIMINATOR
Filed June 3, 1935

Inventors
Levi R. Grandy &
Harry C. Doane.
By Blackmore, Spencer & Flint
Attorneys Patented Jan. 11, 1938

2,104,800

UNITED STATES PATENT OFFICE 2,104,800

RADIO STATIC ELIMINATOR

Levi R. Grandy and Harry C. Doane, Flint, Mich., assignors to General Motors Corporation, Detroit, Mich., a corporation of Delaware Application June 3, 1935, Serial No. 24,630

3 Claims. (Cl. 175—264)

This invention relates to means to collect and dissipate the charge of static electricity that is built up upon the tires and wheels used on automotive vehicles.

It is of course well known that there are sources whereby static electricity is generated in the normal operation of a motor car and that these static charges cause considerable and annoying disturbance in the operation of radio receiving sets that are installed in the cars. With the more widespread use of radio sets in cars, investigations were conducted with a view to locate the source of this static interference so that the same could be eliminated. This investigation disclosed the fact that the static seemed to be more pronounced in dry, clear weather than in wet weather when it practically disappeared. Further investigation brought out the fact that a static charge was found on the wheel and tire and of course in wet, moist weather this charge would not be able to build up but would leak off without any attendant spark. But in dry weather the charge would build up on the wheel until it reached a sufficient potential to jump to ground and each of these discharges would of course make a sound in the radio set. The source of this static charge may be due to several effects. It may come from the friction between the road surface and the tire which seems to be the majority view. It may be due to the flexing of the tire layers themselves upon rotation or it may be due to the air friction on the tire as it rotates and of course it may be a combination of all these. However, it has been proved that a static charge does exist on the tire and wheel. If this charge is allowed to remain it will build up and discharge to the ground causing a spark and a click in the radio. The charge is existent on the tire, rim, spokes and hub as before mentioned, the hub of course being mounted on an axle by suitable bearings. A film of oil or grease is present between the axle, bearings and hub so that the charge on the wheel cannot leak off to the frame through the bearings but is isolated and may build up. In order to avoid the building up of the static on the wheel and tire it is therefore necessary to provide some means whereby it may leak off gradually therefrom to the frame and prevent its attaining a high enough potential to jump to the ground causing a spark.

It is therefore an object of my invention to provide means for dissipating the tire static.

It is a further object to provide means for conducting the static charge from the wheel to the frame for grounding the same.

It is a still further object to provide a device easily applied to the present structure to accomplish the above.

For a better understanding of the nature and objects of the invention, reference is made to the following specification wherein there are described the embodiments of our invention which are illustrated in the accompanying drawing, in which.

Figure 1:
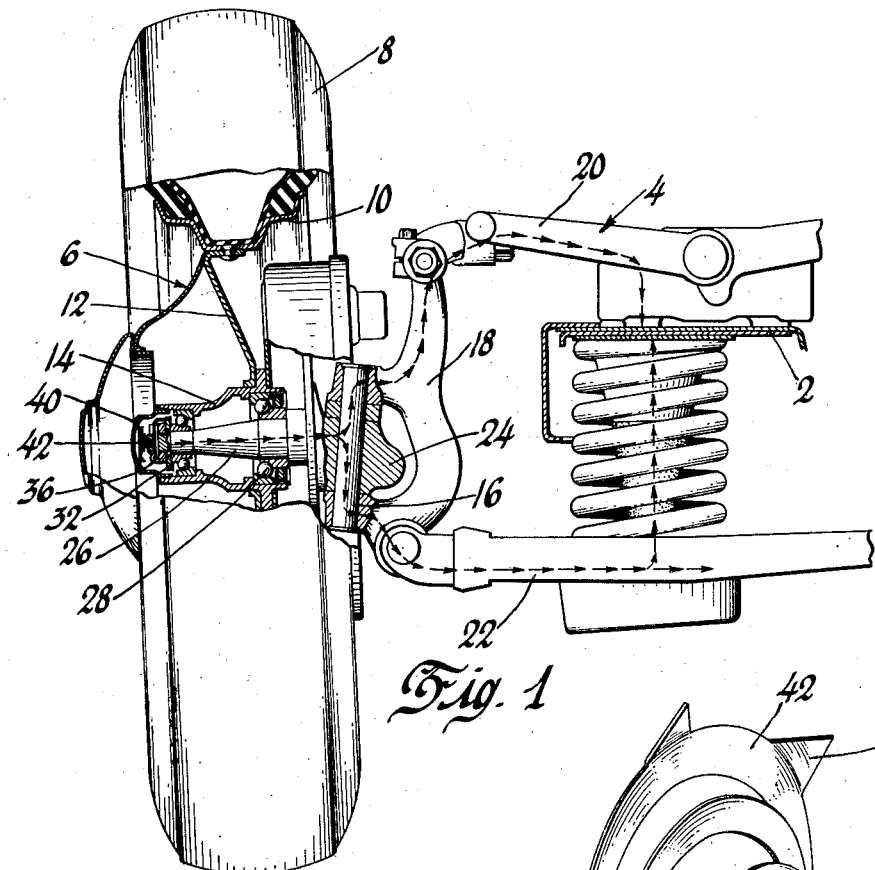
Fig. 1 is a front elevation of one wheel and its support of an automotive vehicle, parts being broken away and shown in section.
Figure 2:
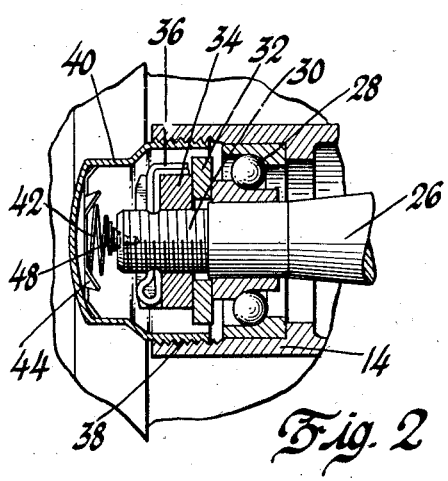
Fig. 2 is an enlarged section through the outer end of the axle and hub of the wheel, showing our invention in place.
Figure 3:
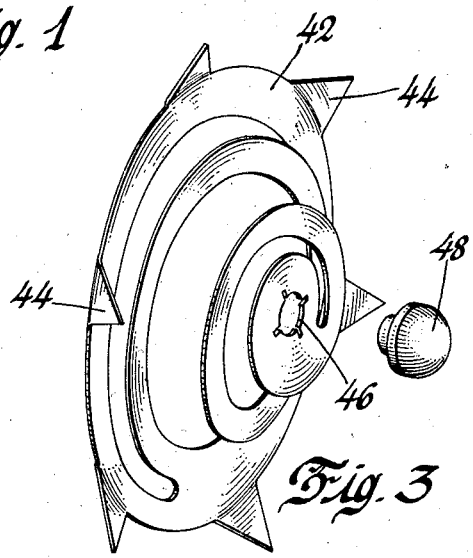
Fig. 3 is an enlarged perspective view of the helical, spiral spring and contact button of our invention.

An automotive frame 2 is supported by a conventional means 4 and a wheel generally designated at 6 which carries thereon a tire 8. The wheel is of course composed of a rim 10, spokes 12 and a hollow hub 14 which are all rigidly secured together in the usual form. The supporting means extending from the frame is shown as one of the present forms of independent springing in which the king pin 16 is vertically supported by arm 18 pivotally connected at both ends to horizontal members 20 and 22 which extend to the frame. The king pin passes through a member 24 which carries the axle 26. Between the interior surface of the hub 14 and the axle 26 are carried the usual ball races and bearings 28 to support the hub and wheel on the axle for its rotation. The end of the axle is of course threaded as shown at 30 and receives a washer 32 and nut 34 for securing the assembly in place. The nut 34 has diametrically opposite slots therein to receive a cotter pin 36 for locking relation therewith. The interior surface of the outer end of the hub is threaded as shown at 38 and into this is secured a dust cap 40.

A one piece stamped-out spiral spring member 42 has a series of triangular portions 44 extending from its base periphery which are adapted to engage the inner surface of the dust cap 40 and retain the spring therein. The central portion of the spring is axially extended and at its center is supplied with an opening 46 in which it carries a contact button 48 which is adapted to bear in its assembled position against the end of the shaft or axle 26, the latter having a small hole bored therein so that there may be better contact between the button 48 and the axle.

It will thus be seen that any electro static charge which tends to build up on the tire or various portions of the wheel may be conducted from the hub through the dust cap 40 and through the coils of the spring 42 to the contact button 48, to the axle 26, and thereby by a plurality of paths to the frame 2 which acts as a ground for all the electric equipment carried by the car. The various paths which the electricity may take after it reaches the shaft are shown by the arrows in Fig. 1. In this way the charge generated by the tire may leak off gradually to the frame and so is prevented from building up to such an extent that a spark may jump to cause static interference in the radio set.

We claim:

1. In an automotive vehicle, an axle, a wheel having a pneumatic tire rotatably supported on an insulating lubricating film thereon, a hub in the wheel, a cap fitting in the open hub end, a resilient member secured within the cap and carrying contact means bearing against the axle end to electrically connect by a low resistance path the wheel with the axle bypassing the lubricating film.

2. In an automotive vehicle, an axle, a wheel having a pneumatic tire rotatably supported on an insulating lubricating film thereon, resilient means secured to the wheel and a contact carried by said means and bearing against the bare axle to electrically connect the wheel with the axle to allow any charge present on the wheel to leak off by way of the axle bypassing the lubricating film.

3. An accessory for eliminating static charges on pneumatic tired wheels rotating on axles and insulated therefrom by a lubricating film comprising, a cap, a spiral helical spring secured within the cap and a contact button carried by the end of the spring whereby when the cap is carried by a part of the wheel the contact button bears against the bare axle to allow any charge on the wheel to leak off by way of the axle.

LEVI R. GRANDY.
HARRY C. DOANE.